United States Patent
Polito et al.

[19]

[11] Patent Number: 6,009,166
[45] Date of Patent: Dec. 28, 1999

[54] NITINOL HOOKSWITCH ACTUATOR

[75] Inventors: Fred I. Polito, Santa Cruz; Robert V. Davies, Scotts Valley; Gerald W. Skulley, Santa Cruz; Michael D. Perry, Los Altos; Kevin A. Sawyer, Mountain View; Brett A. Herscher, Cupertino; Robert J. Bernardi, Scotts Valley, all of Calif.

[73] Assignee: Plantronics, Inc., Santa Cruz, Calif.

[21] Appl. No.: 08/916,582

[22] Filed: Aug. 22, 1997

[51] Int. Cl.⁶ ..................................................... H04M 1/00
[52] U.S. Cl. .......................... 379/422; 379/422; 379/424; 379/425; 379/427; 379/428; 379/440
[58] Field of Search ..................................... 379/433, 428, 379/420, 447, 424–427, 422, 441; 244/75 R; 455/89; 318/560; 200/16 A

[56] References Cited

U.S. PATENT DOCUMENTS

| 4,692,940 | 9/1987 | Baines | 379/424 |
| 4,742,542 | 5/1988 | Jantzi | 379/441 |
| 4,961,033 | 10/1990 | Hirota | 318/560 |
| 5,033,083 | 7/1991 | Gotfryd et al. | 379/427 |
| 5,590,417 | 12/1996 | Rydbeck | 455/89 |
| 5,752,672 | 5/1998 | McKillip, Jr. | 244/75 R |
| 5,778,061 | 7/1998 | Parment et al. | 379/428 |

FOREIGN PATENT DOCUMENTS 0 680 188 A2  11/1995  European Pat. Off. .

*Primary Examiner*—Krista Zele
*Assistant Examiner*—Bing Bui
*Attorney, Agent, or Firm*—Fenwick & West LLP

[57] ABSTRACT

A hookswitch actuator including an activating mechanism which maintains the hookswitch circuit of a telephone in an "on hook" state when the activating mechanism is in a first position, or in an "off hook" state when the activating mechanism is in the second position. The movement of the activating mechanism between the two positions is accomplished through the use of a shape memory alloy mechanism. The shape memory alloy mechanism is coupled to the activating mechanism in such a way that heating or cooling of the shape memory alloy mechanism moves the activating mechanism between its two positions. Control of the heating and cooling of the shape memory alloy mechanism is effectuated by controlling the amount of electric current passing through it.

27 Claims, 8 Drawing Sheets

NITINOL HOOKSWITCH ACTUATOR

BACKGROUND OF THE INVENTION

1. Field of the Invention

This invention relates to the field of actuators, and more particularly to a device which utilizes a shape memory alloy mechanism to change the state of a telephone hookswitch circuit.

2. Description of the Related Art

Telephone headsets are well-known and widely used in business settings. Headsets allow a person to hold a conversation while still having both hands free to operate other devices, take notes, and the like. There are many situations in which a person talking on a telephone would want to be able to move around or away from the telephone in addition to having his or her hands free. For example, a headset user whose telephone base is at his or her desk might be working elsewhere at a table or a filing cabinet while holding a telephone conversation. A cordless headset allows a user to roam further from the telephone base than does a corded headset.

In order to answer or initiate a telephone call with a standard handset telephone, a user simply lifts the handset. This action changes the state of a hookswitch circuit in the telephone base. When the handset is "on hook," the hookswitch circuit is open, and the telephone is not active. When the handset is "off hook," the hookswitch circuit is closed, and the telephone is active and available to make or receive a call. In most handset telephones the state of the hookswitch circuit is changed through the position of a hookswitch in one or more of the wells where the handset rests. In many telephones, the hookswitch is a lever which is pushed out of a slot in the well of a telephone by a spring. When the handset is placed on the telephone base with a portion of the handset in the hookswitch well, the hookswitch is depressed, opening the hookswitch circuit. When the handset is lifted the hookswitch is allowed to spring forward, closing the hookswitch circuit and activating the telephone. In some telephones, the hookswitch is not mechanically activated by a spring, but rather is activated by a magnetic induction circuit in response to the presence or absence of the handset in the telephone base.

Without a special device to control the hookswitch circuit, a headset user must lift the handset off the telephone base in order to put the hookswitch circuit in the "off hook" state before answering or initiating a call. The handset must be kept off the hookswitch for the duration of the call. Headset users may find this annoying since some place other than the telephone base must be found for the handset to rest. Headset users also find the need to remove the handset particularly troublesome since they are required to return to the telephone base to answer or initiate a telephone call. This undermines the utility of a headset, particularly cordless headsets, since the user is not able to answer or initiate calls remotely or in a hands-free manner.

Mechanisms have been devised to displace the handset from the telephone base for headset users. Mechanical lifters have been employed to lift and hold the handset above the hookswitch. Such lifters typically have a lever which is moved or rotated by the user to raise and lower the handset. However, these systems still require users of either corded or cordless headsets to return to the telephone base each time a call is to be answered or initiated. Thus, these devices do not adequately serve the needs of many headset users.

Electro-mechanical lifters use electric motors and gears to effect the lifting of the handset (or other weight placed on the hookswitch). Because this kind of lifter is controlled electrically, it is possible to design an electromechanical lifter system to respond to a remote signal. Such an electromechanical lifter may allow headset users to answer or initiate telephone calls without returning to the telephone base. Electro-mechanical lifters, however, are typically complex and expensive. Their complexity generally results in their being bulky objects which take up desk space next to the telephone base. The expense of electromechanical lifters prohibits their wide acceptance and use, for example in call centers with hundreds or even thousands of users, or by ordinary consumers.

Accordingly, it is desirable to provide an apparatus for operating the hookswitch of a telephone base that overcomes the limitations of conventional products by providing an inexpensive, easy to use apparatus for activating the hookswitch, and that is amenable to remote operation.

SUMMARY OF THE INVENTION

The present invention provides a mechanically simple and inexpensive hookswitch actuator that is capable of changing the state of a hookswitch circuit in response to an electric current. In one embodiment, the hookswitch actuator rests either on or in the well of a telephone base that contains the hookswitch circuit sensor, which is generally either a hookswitch or a magnetic sensor. An activating mechanism in the hookswitch actuator is situated such that it can move between two positions. In the first position the activating mechanism maintains the hookswitch circuit in an "on hook" state. In the second position the activating mechanism maintains the hookswitch circuit in an "off hook" state. For hookswitch circuits which utilize magnetic sensors, a magnet is coupled to, or incorporated within, the activating mechanism in order to maintain the hookswitch circuit in an "on-hook" or "off-hook" state.

Movement of the activating mechanism between the first and second positions is accomplished through the use of a shape memory alloy mechanism. A shape memory alloy mechanism is one which will contract when heated and return to its original size and shape when allowed to cool. The shape memory alloy mechanism is coupled to the activating mechanism in such a way that heating or cooling of the shape memory alloy mechanism moves the activating mechanism between its two positions. Control of the heating and cooling of the shape memory alloy mechanism is effectuated by controlling the amount of electric current passing through it.

The electric current can be applied in response to a remote signal, for example, as from a cordless headset user situated at a distance from the telephone base and the hookswitch actuator. Various mechanisms can be used to provide an electric current in response to a remote signal. Remote actuation of the hookswitch circuit offers users of both corded and cordless headsets an efficient way to answer and initiate calls without returning to the telephone base.

The hookswitch actuator is contained within a small housing and located in the hookswitch well of the telephone base, avoiding the desk clutter which is common with conventional devices. The housing can be formed in various ways in order to fit the various shapes of hookswitch wells. The activating mechanism includes a moving plate having a surface area which is large enough to depress a hookswitch regardless of where the hookswitch is located in the hookswitch well. In this way, the hookswitch actuator is easily adaptable to many existing telephone bases having variously-shaped hookswitch wells and variously-located hookswitches.

These and other features, aspects, and advantages of the present invention will become better understood with regard to the following description, appended claims, and accompanying drawings.

DETAILED DESCRIPTION OF THE INVENTION

Figure 1A:
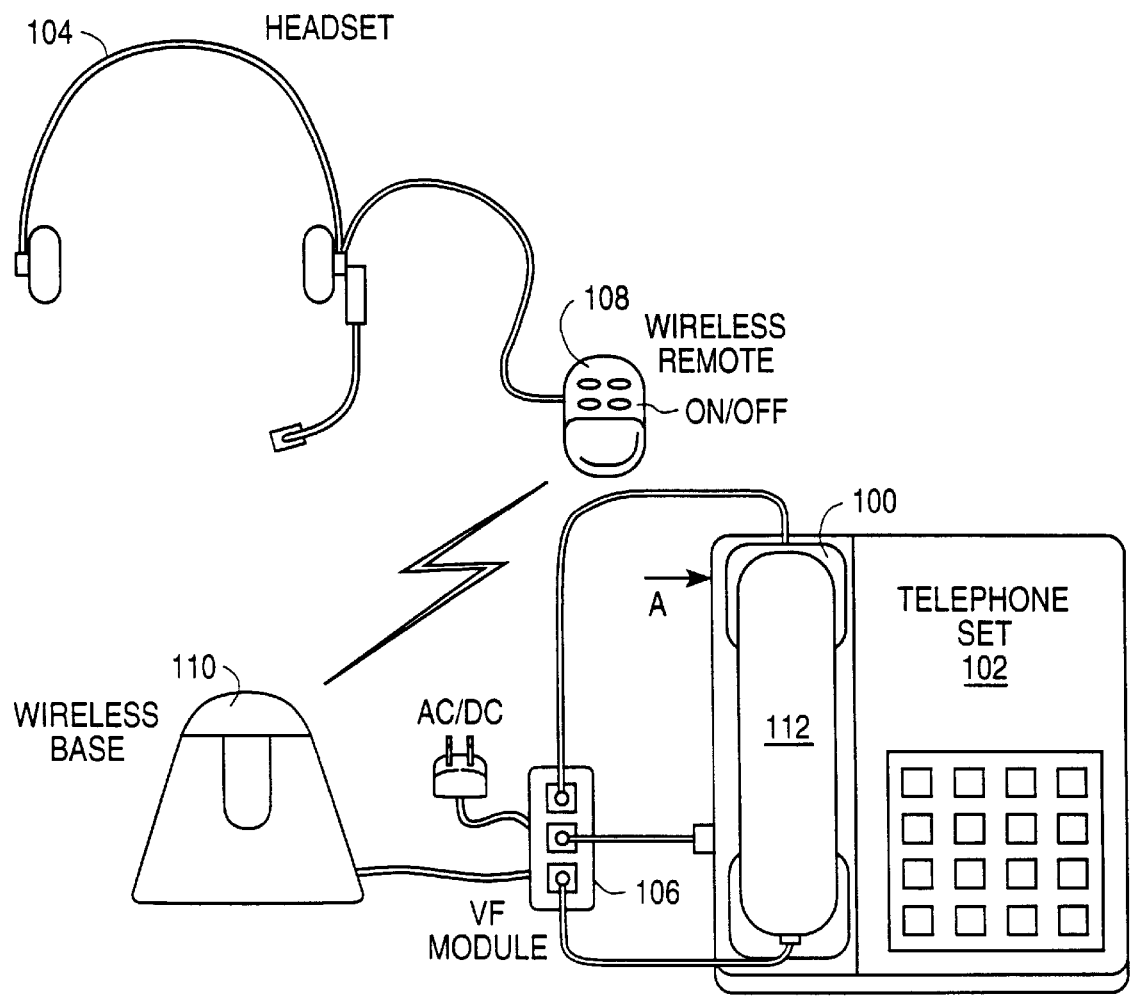
FIG. 1A is an illustration of one example of a telecommunications environment in which a hookswitch actuator according to the present invention operates.

FIG. 1A illustrates one example of a telecommunications environment in which a hookswitch actuator 100 according to the present invention operates. In particular, the telecommunications environment preferably includes a telephone 102 having a handset 112, a headset 104, an interface module 106, a wireless remote unit 108, a wireless base unit 110, and the hookswitch actuator 100 according to the present invention. The interface module 106 is coupled intermediate the wireless base unit 110 and the hookswitch actuator 100. The interface module 106 is also coupled to the telephone 102 and to the telephone handset 112. The interface module 106 may be for either corded headsets, such as the model M10 Corded headset Interface, manufactured by Plantronics, Inc, of Santa Cruz, Calif., or for cordless headsets (as shown). The headset interface 106 allows the headset 104 to communicate with the telephone 102 by transceiving communication signals therebetween, via the wireless base unit 110 or a corded headset interface. Using the wireless base unit 110, such communication signals may be in the form of conventional infrared signals, radio frequency signals, or the like. An example of an infrared communication system, including the wireless base unit 110 and the wireless remote unit 108, is described in U.S. patent application Ser. No. 08/614,518 entitled "Infrared Communications System and Method," filed on Mar. 13, 1996. The application has the same assignee as the present invention, and is incorporated herein by reference in its entirety.

Figure 1B:
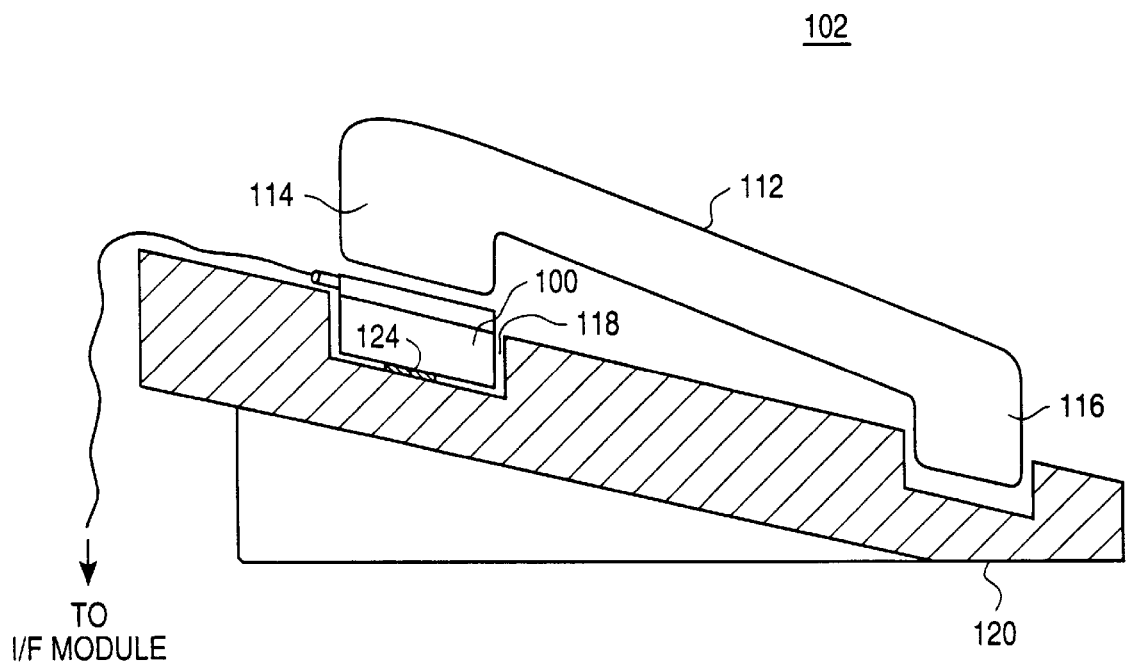
FIG. 1B is a side view of a conventional telephone set showing a hookswitch actuator according to the present invention residing in the hookswitch well of the telephone set.

As shown in FIG. 1B, the conventional telephone 102 comprises a telephone base 120 and the telephone handset 112. The handset 112 is connected to the telephone base 120 via a conventional telephone cord. The handset 112 includes an earpiece 114 and a mouthpiece 116. The hookswitch actuator 100 resides in the hookswitch well 118 in order to activate the hookswitch circuit of the telephone 102 by controlling movement of a hookswitch 124. The hookswitch 124 is conventionally coupled to the hookswitch circuit to place the hookswitch circuit in an "on-hook" state when the hookswitch 124 is depressed, and to place the hookswitch circuit in an "offhook" state when the hookswitch 124 is released. The hookswitch well 118 is that well of the telephone base 120 that includes the hookswitch 124. In this configuration, the earpiece 114 of the handset 112 rests on top of the hookswitch actuator 100.

An example of a typical use of the hookswitch actuator 100 in the telecommunications environment shown in FIG. 1A is as follows. A user, wearing the headset 104, is notified of an incoming call through any conventional means such as a noise in the headset 104, the telephone 102 ringing, or the like. After receiving notification of the incoming call, the user provides an activation signal to the wireless base unit 110 via the wireless remote unit 108 indicating that the telephone 102 should be placed in an "off-hook" state. Upon receiving the activation signal, the wireless base unit 110 sends a signal to the interface module 106 which, in turn, sends an initiation signal to the hookswitch actuator 100, causing the actuator 100 to place the telephone 102 in the "off-hook" state. Once the telephone 102 is in the "off-hook" state, a communications channel is set up between the headset 104 and the telephone 102 in a conventional manner. Thus, the user wearing the headset 104 is saved the time and effort of having to return to the telephone base 102 to physically remove the handset 112 in order to place the telephone 102 in the "off-hook" state. Operation of the actuator 100 is described in detail with reference to FIGS. 6 and 7, below.

Figure 2:
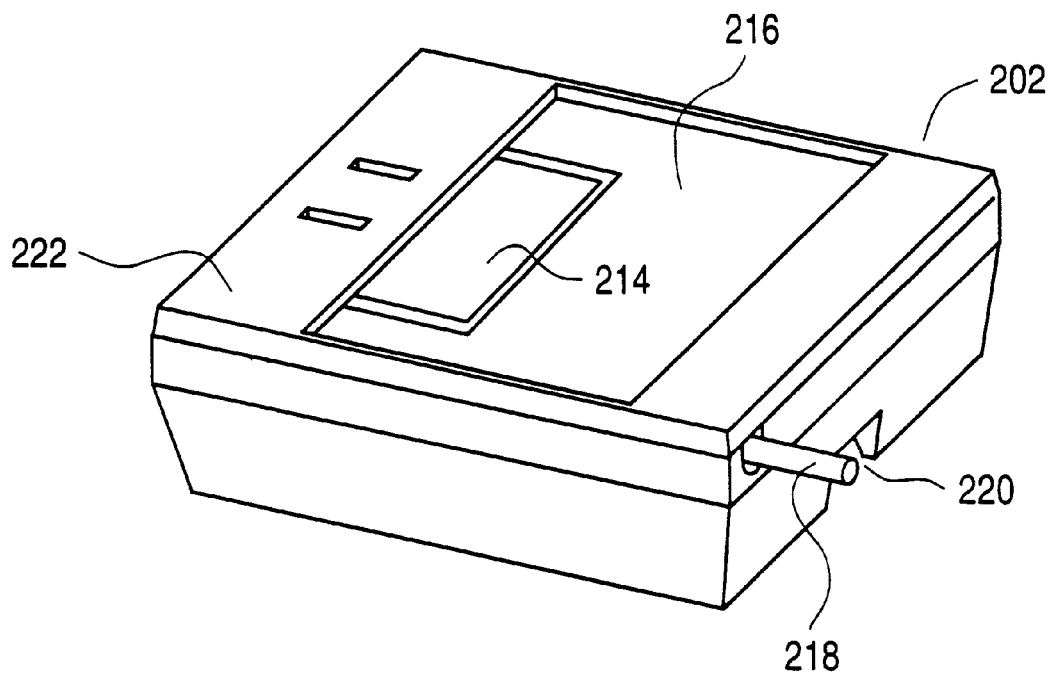
FIG. 2 is a perspective view of one embodiment of the hookswitch actuator according to the present invention.
Figure 3:
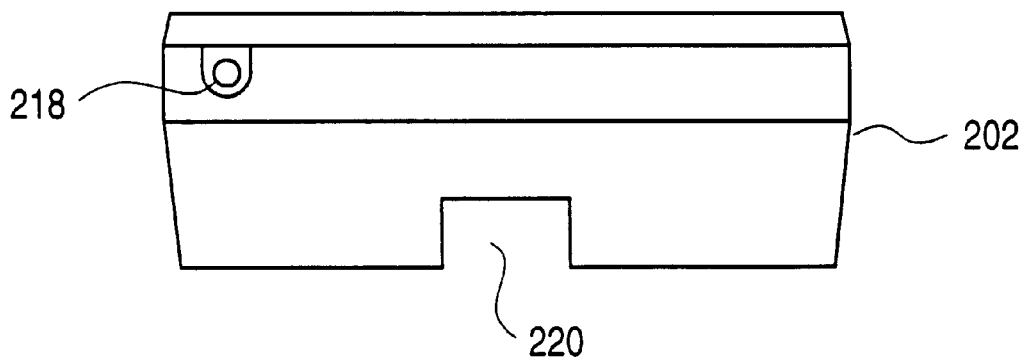
FIG. 3 is a side view of one embodiment of the hookswitch actuator according to the present invention.

The hookswitch actuator 100 according to the present invention is shown in FIG. 2. The preferred embodiment of the hookswitch actuator 100 of the present invention is comprised of a substantially enclosed housing 202 having a partially hollow interior. The housing 202 is preferably made of a hard, durable, moldable plastic, such as acrylonitril butadiene styrene (ABS) plastic, and is shaped to fit within a hookswitch well of a telephone base. In the embodiment shown in FIGS. 1B and 2, the housing 202 is generally rectangular in shape and fits, for example, within the hookswitch well 118 of an AT&T® 700 series phone. A recessed section 216 of the top portion of the housing 202 is used to rest the earpiece 114 of the handset 112. Within the recessed section 216 there resides a handset switch 214 coupled to the top cover 222 of the housing 202. In operation, the earpiece 114 of the telephone handset 112 is placed on the handset switch 214, as shown in FIG. 1 B. The handset switch 214 uses conventional circuitry to actuate the hookswitch actuator 100 if the handset 112 is lifted. The switch 214 will also re-route the call to the handset 112 instead of the headset 104 when the handset 112 is lifted. Also shown in FIG. 2 is a cable 218 for electrical power and control signal inputs. An aperture 220, shown partially in FIG. 2, and more fully from the side view of FIG. 3, is wide enough for a hookswitch to enter therein.

Figure 4A:
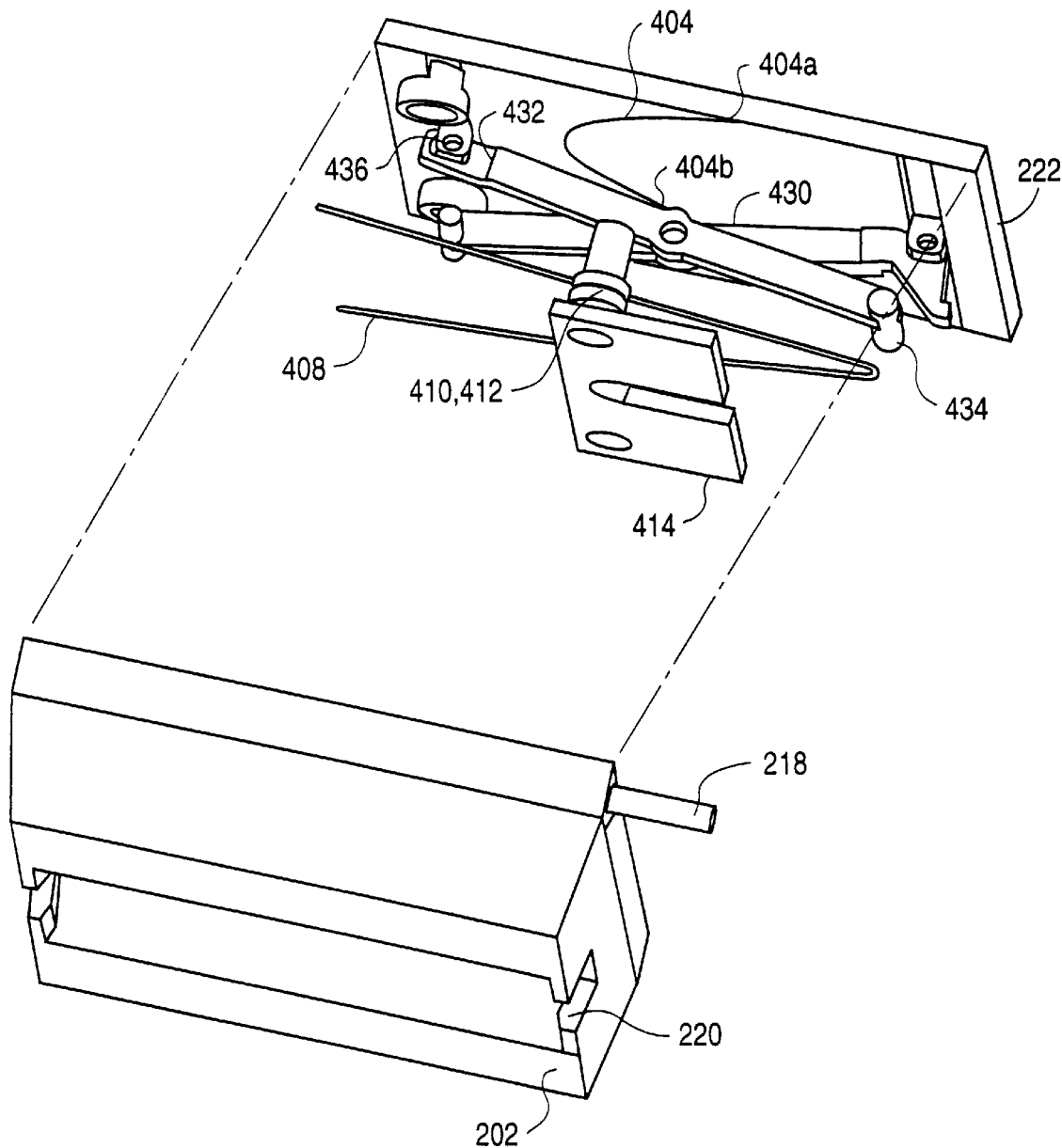
FIG. 4A and 4B are exploded views of one embodiment of the hookswitch actuator according to the present invention.
Figure 4B:
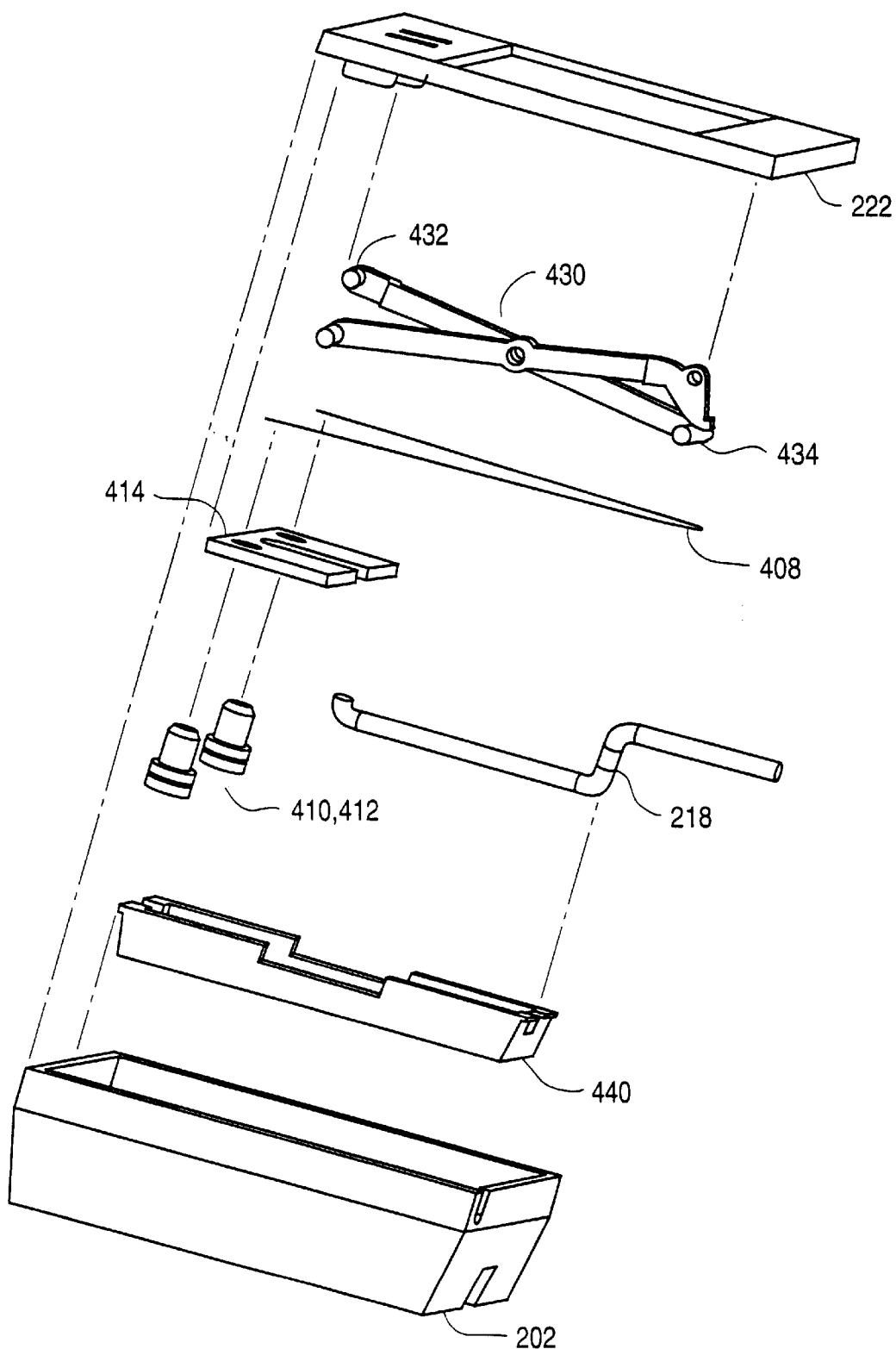
Figure 4C:
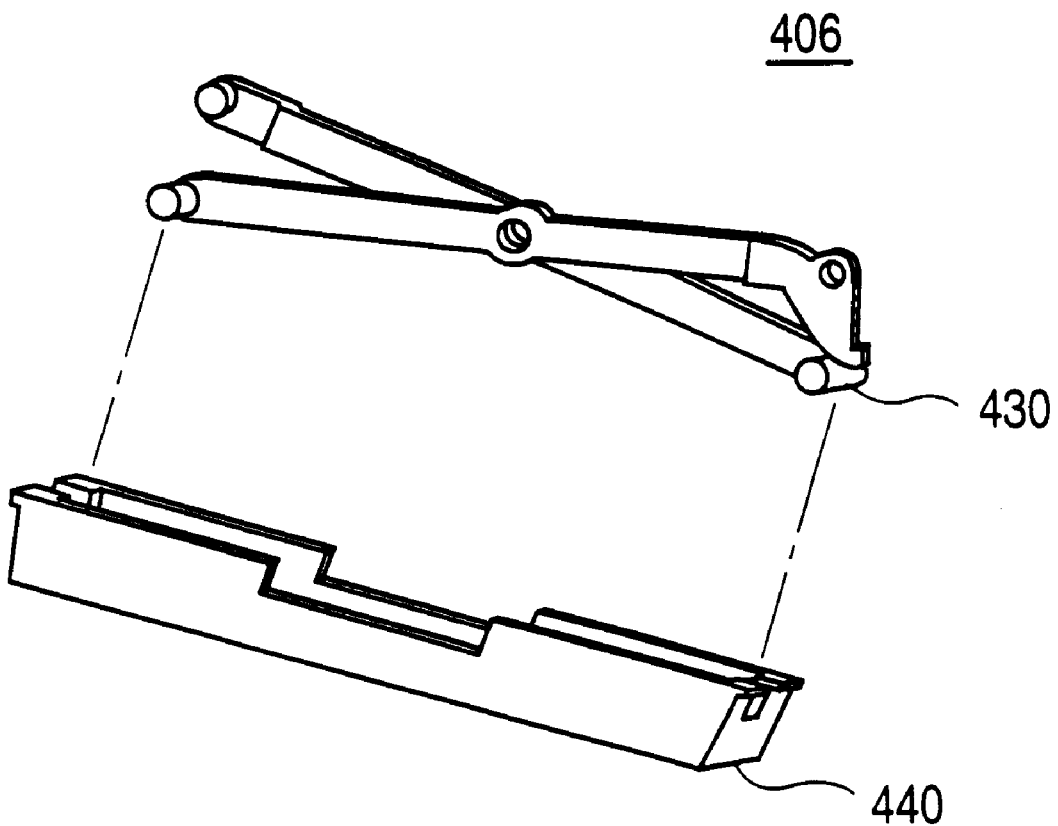
FIG. 4C shows the activating mechanism and its component parts.
Figure 5:
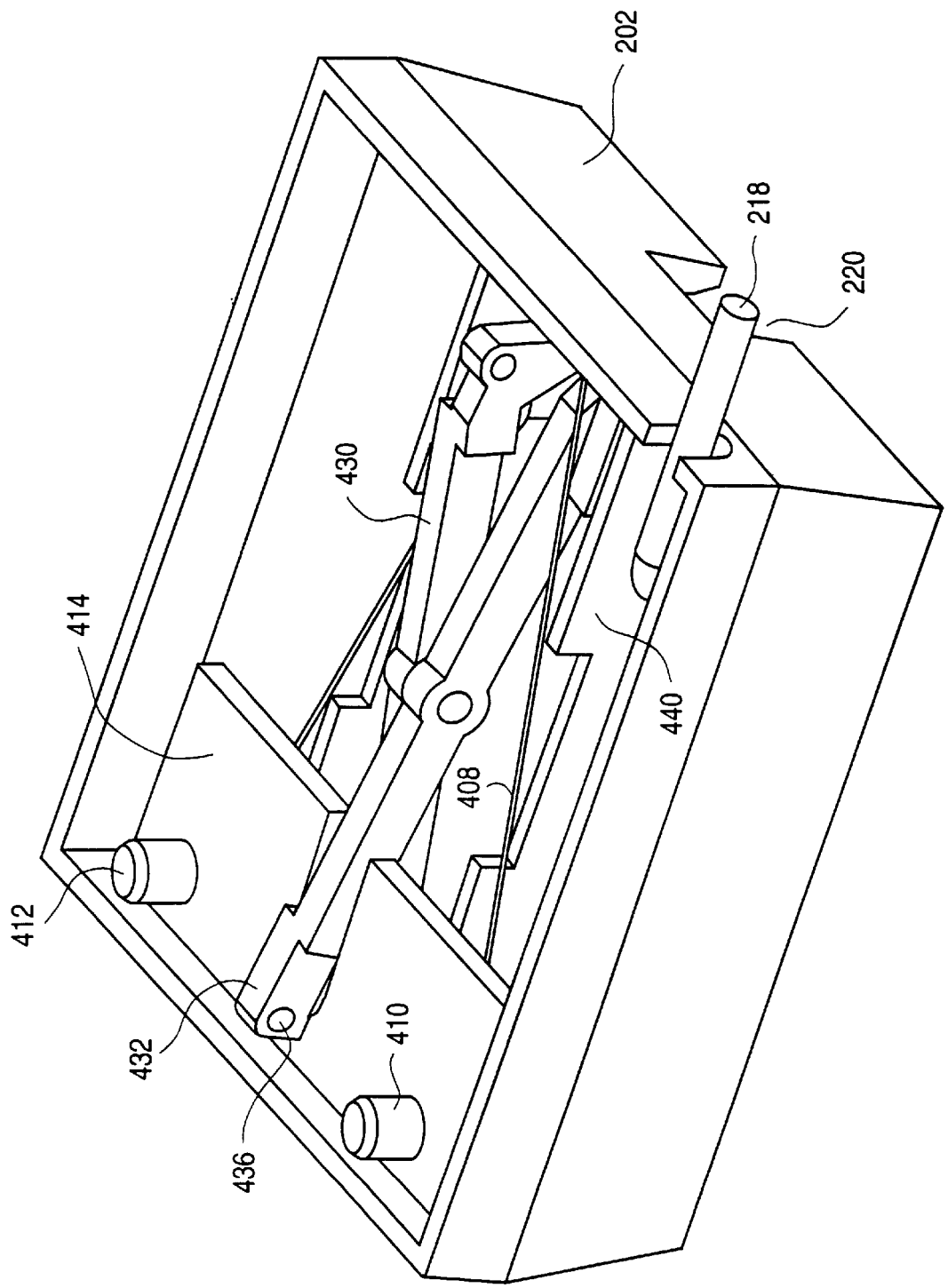
FIG. 5 is a cross-sectional view of the hookswitch actuator of the present invention with the top cover removed.

In FIGS. 4A, 4B, and 5 there are shown exploded views and a cross-sectional view, respectively, of a preferred embodiment of the hookswitch actuator according to the present invention. Within the interior of the housing 202 reside a spring 404, a scissors-like lever assembly 430 coupled to a moving plate 440, a shape memory alloy (SMA) mechanism 408, a pair of electrical contact posts 410, 412 and a conventional printed circuit board (PCB) assembly 414. The scissor-like lever assembly 430 coupled to the moving plate 440 is collectively known as the activating mechanism 406, as illustrated in FIG. 4C.

In a preferred embodiment, the first end 432 of one of the "blades" of the scissors-like lever assembly 430 is pivotally coupled to the housing 202 through a pivot 436 attached to the top cover 222 of the housing 202. The second end 434 of the one of the "blades" has a curved notch for securing the SMA mechanism 408.

The spring 404 is a flat planar type and is bent into a generally U-shaped form. The spring 404, having a first and second end 404a, 404b, is coupled on the first end 404a to the top cover 222 of the housing 202. The second end 404b of the spring 404 is coupled to the top side of one of the "blades" of the scissors-like lever assembly 430. The spring 404 operates in compression and urges the scissors-like lever assembly 430 of the activating mechanism 406 towards its first of two positions. The spring 404 is strong enough to cause the scissors-like lever assembly 430 of the activating mechanism 406 to depress a hookswitch when the activating mechanism 406 is in the first position. The activating mechanism 406 preferably comprises the scissors-like lever assembly coupled to the moving plate 440. Alternatively, the activating mechanism 406 may be a lever or any other similar device which can pivot between two positions and place the hookswitch into an "on-hook" and "off-hook" state.

The SMA mechanism 408 is preferably in the form of a wire which is coupled on both ends to the pair of electrical contact posts 410, 412. The SMA mechanism 408 is displaced against the scissors-like lever assembly 430 of the activating mechanism 406 such that it tightly loops around the curved notch of the second end 434 of one of the blades of the scissors-like lever assembly 430. This loop allows the SMA mechanism 408 to constrain the position of the activating mechanism 406 against the urging of the spring 404. While the preferred form of the SMA mechanism 408 is a wire, one skilled in the art will recognize that other forms may be used such as a spring or the like.

Figure 6:
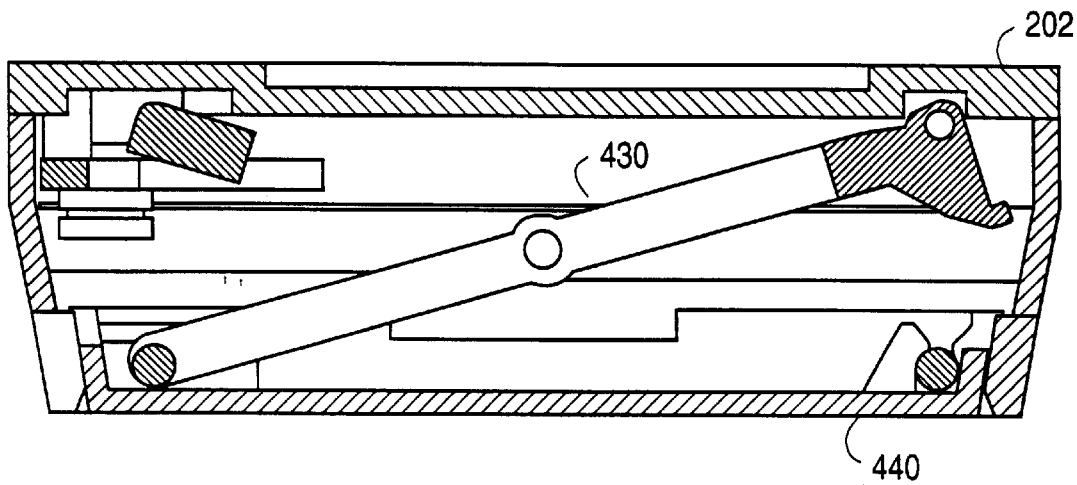
FIG. 6 is a side view of the hookswitch actuator showing the activating mechanism in the first, or "on-hook," position.
Figure 7:
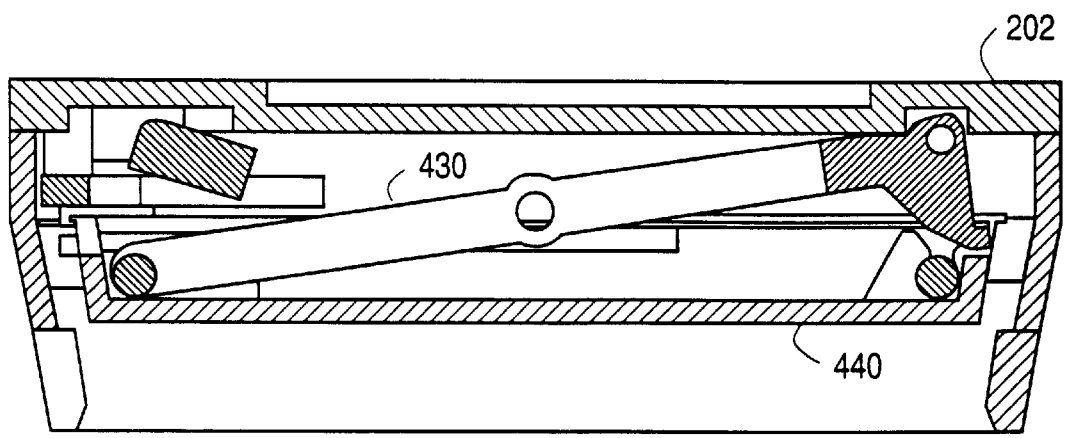
FIG. 7 is a side view of the hookswitch actuator showing the activating mechanism in the second, or "off-hook," position.

In operation, the activating mechanism 406 rotates between a first and a second position. FIGS. 6 and 7 illustrate the activating mechanism 406 in the first and second position, respectively. In both of these figures, only one of the two "blades" of the lever assembly 430 is shown for clarity. The SMA mechanism 408 controls the position of the activating mechanism 406 through the flow of electrical current within the SMA mechanism 408. Electrical current is supplied to the SMA mechanism 408 from an external electrical power supply via the cable 218, which is electrically coupled to the electrical contact posts 410, 412. When no current flows through the SMA mechanism 408, the activating mechanism 406 is in the first position and completely depresses a hookswitch 124 under the force of the spring 404, thereby placing the telephone 102 in an "on hook" state. When current flows through the SMA mechanism 408, it contracts and forces the activating mechanism 406 into the second position, thereby releasing the hookswitch 124 and placing the telephone 102 in the "off hook" state, allowing a user to make or receive a telephone call. Thus, when the activating mechanism 406 is in the first position, the telephone 102 is in the "on-hook" state, and when the activating mechanism 406 is in the second position, the telephone 102 is in the "off-hook" state. The surface area of the moving plate 440 is large enough to depress the hookswitch 124 regardless of where the hookswitch is located in the hookswitch well 188. In this way, the hookswitch actuator 100 is easily adaptable to many existing telephone bases having variously-shaped hookswitch wells and variously-located hookswitches. For hookswitch circuits which utilize magnetic sensors, a magnet is coupled to, or incorporated within, the activating mechanism 406 in order to place the telephone in the "on-hook" or "off-hook" state. In the embodiment shown in FIGS. 6 and 7, the magnet would be coupled to the moving plate 440 and the activating mechanism 406 would operate in the same manner as described above.

More particularly, when enough current flows through the SMA mechanism 408 to heat it above a transformation temperature, $T_{M-A}$, it transitions from a martensitic state to an austenitic state. When martensitic, the SMA mechanism 408 is characteristically soft and malleable. When austenitic, the SMA mechanism 408 hardens and contracts. During this contraction, force is applied by the SMA mechanism 408 to pull the activating mechanism 406 into the second position. This allows the hookswitch 124 to fully extend as shown in FIG. 6. When little or no current flows through the SMA mechanism 408, it cools to a temperature below $T_{M-A}$ and becomes soft and malleable again. The activating mechanism 406, under the force of the spring 404, once again depresses the hookswitch 124.

In the preferred embodiment, the SMA mechanism 408 is a conventional nitinol wire with a gauge of approximately 0.005–0.010 and a $T_{M-A}$ of approximately 90° C. The strength and elongation capabilities of the SMA mechanism 408 allow for the use of very fine wire. The thermal mass of such a very fine wire is minute compared to the housing 202 and thus it does not transfer significant heat to the housing 202. The hookswitch actuator 100 therefore will not cause any heat-related damage to the hookswitch well 118, the telephone handset 112, or the rest of the telephone 102.

The internal resistance of the SMA mechanism 408 generates heat when electric current flows through it. In the preferred embodiment, the SMA mechanism 408 is thin enough so that a current between about 150 mA and 300 mA will generate enough heat to quickly retract the activating mechanism 406 into its second position, and thereby quickly release the hookswitch 124. Once the SMA mechanism 408 is heated enough for the activating mechanism 406 to reach the second position, the current is lowered to about 50 mA in order to keep the off-hook state for the duration of a call. Because of the small thermal mass of the nitinol wire, it cools quickly as the current flow decreases or ceases to flow. The SMA mechanism 408 is preferably maintained at a low current preheat between 60°–90° C. at all times in order to advantageously decrease the time it takes to switch the activating mechanism 406 from the "on hook" position to the "off hook" position. The PCB assembly 414 includes a conventional microprocessor which is coupled to the SMA mechanism 408 to provide open loop control of the temperature of the SMA mechanism 408 in a conventional manner. The microprocessor is used to compare the temperature of the SMA mechanism 408 to ambient, pre-heat the SMA mechanism 408 to a known temperature to minimize actuation time, provide current levels for actuation, hold current levels to maintain actuation, and remove all current levels to de-actuate over a timed period. All currents are controlled using conventional Pulse Width Modulation to pulse the current to the wire for maximal use of the available power, thus advantageously conserving energy.

In summary, the present invention provides a simple, low-cost device adaptable to many existing phone systems which allows a headset user to answer a telephone call without having to return to the telephone base. Furthermore, the present invention also provides the user with the option of answering the telephone call by the conventional method of picking up the telephone receiver.

We claim:

1. An apparatus for activating a hookswitch circuit of a telephone, the telephone having at least one hookswitch well associated with the hookswitch circuit, the hookswitch circuit having an on-hook state and an off-hook state, the apparatus comprising:

an activating mechanism for coupling to the hookswitch well and having a first position for disposing the hookswitch circuit into the on-hook state and a second position for disposing the hookswitch circuit into the off-hook state; and a shape memory alloy mechanism, coupled to the activating mechanism, that changes the position of the activating mechanism in response to an electrical current flowing through the shape memory alloy mechanism.

2. The apparatus of claim 1, wherein the shape memory alloy mechanism is a wire.

3. The apparatus of claim 1, wherein the shape memory alloy is made of nitinol.

4. The apparatus of claim 1, wherein the activating mechanism is a lever.

5. The apparatus of claim 1, wherein the activating mechanism comprises a scissors-like lever assembly and a platform, the scissors-like lever assembly coupled intermediate the platform and the shape memory alloy mechanism.

6. The apparatus of claim 5, wherein the platform has a surface area which is sized to cover the entire hookswitch well surface where the hookswitch resides.

7. The apparatus of claim 1, wherein the telephone includes a hookswitch in the hookswitch well that activates the hookswitch circuit, the activating mechanism in the first position depresses the hookswitch to place the hookswitch circuit in the on-hook state, and the activating mechanism in the second position releases the hookswitch to place the hookswitch circuit in the off-hook state.

8. The apparatus of claim 1, further comprising:

a spring attached to the activating mechanism to urge the activating mechanism towards the first position.

9. The apparatus of claim 1, further comprising:

an electrical current source electrically coupled to the shape memory alloy mechanism for supplying the electrical current that flows through the shape memory alloy mechanism.

10. The apparatus of claim 1, further comprising:

a housing containing and coupled to the activating mechanism, the housing shaped to reside within the handset well.

11. The apparatus of claim 10, further comprising:

a microprocessor coupled to both the shape memory alloy mechanism and the electrical current source for controlling the level of current which flows through the shape memory alloy mechanism.

12. The apparatus of claim 1, further comprising:

a handset switch coupled to the activating mechanism and further coupled to a switch for alternately coupling the telephone between a handset and a headset of the telephone, the handset switch having a first position supporting the handset to dispose the switch to couple the telephone to the headset and having a second position responsive to the handset being removed to dispose the activating mechanism into its second position and to dispose the switch to couple the telephone to the handset.

13. The apparatus of claim 1 wherein the shape memory alloy mechanism is preheated to quickly change the position of the activating mechanism from the first position to the second position in response to the electrical current.

14. An apparatus for activating a hookswitch of a telephone, the telephone having at least one handset well associated with the hookswitch, the hookswitch having an on-hook position and an off-hook position, the apparatus comprising:

a housing sized to couple with the handset well;

an activating mechanism coupled to an interior member of the housing, having a first position with respect to the housing that disposes the hookswitch into the on-hook position, and a second position with respect to the housing that disposes the hookswitch into the off-hook position;

a shape memory alloy wire coupled to an interior member of the housing and to the lever, for contracting in response to an electrical current flowing through it to move the lever from the first position to the second position; and a current source electrically coupled to the shape memory alloy wire for supplying the electrical current that flows through the shape memory alloy wire.

15. The apparatus of claim 14, wherein the shape memory alloy is nitinol.

16. The apparatus of claim 14 wherein the shape memory alloy wire is preheated to quickly change the position of the activating mechanism from the first position to the second position in response to the electrical current.

17. A system for activating a hookswitch circuit of a telephone, the telephone having at least one hookswitch well associated with the hookswitch circuit, the hookswitch circuit having an on-hook state and an off-hook state, the system comprising:

a remote unit, having an input and an output, the input coupled to receive an activation signal, the remote unit for sending a wireless signal responsive to receiving the activation signal;

a base unit, having an input and an output, the input of the base unit remotely coupled to the output of the remote unit to receive the wireless signal, the output of the base unit for sending an initiation signal responsive to receiving the wireless signal;

an activating mechanism coupled to the output of the base unit for receiving the initiation signal and for coupling to the hookswitch well, the activating mechanism having a first position for disposing the hookswitch circuit into the on-hook state, and a second position for disposing the hookswitch circuit into the off-hook state upon receiving the initiation signal; and a shape memory alloy mechanism, coupled to the activating mechanism, that changes the position of the activating mechanism in response to an electrical current flowing through the shape memory alloy mechanism.

18. The system of claim 17, wherein the shape memory alloy mechanism is a nitinol wire.

19. The system of claim 17, wherein the activating mechanism comprises a scissors-like lever assembly and a platform, the scissors-like lever assembly coupled intermediate the platform and the shape memory alloy mechanism.

20. The system of claim 19, wherein the platform has a surface area which is sized to cover the entire hookswitch well surface where the hookswitch resides.

21. The system of claim 17, wherein the telephone includes a hookswitch in the hookswitch well that activates the hookswitch circuit, the activating mechanism in the first position depresses the hookswitch to place the hookswitch circuit in the on-hook state, and the activating mechanism in the second position releases the hookswitch to place the hookswitch circuit in the off-hook state.

22. The system of claim 17, further comprising:

an electrical current source electrically coupled to the shape memory alloy mechanism for supplying the electrical current that flows through the shape memory alloy mechanism.

23. The apparatus of claim 22, further comprising:

a microprocessor coupled to both the shape memory alloy mechanism and the electrical current source for controlling the level of current which flows through the shape memory alloy mechanism.

24. The system of claim 17, further comprising:

a housing containing the activating mechanism, and having top surface;

a handset switch in the top surface and coupled to the activating mechanism and further coupled to a switch for alternately coupling the telephone between a handset and the remote unit, the handset switch having a first position supporting the handset to dispose the switch to couple the telephone to the remote unit, and a having second position responsive to the handset being removed to dispose the actuating mechanism into its second position and to dispose the switch to couple the telephone to the handset.

25. The system of claim 17 wherein the shape memory alloy wire is preheated to quickly change the position of the activating mechanism from the first position to the second position in response to the electrical current.

26. An apparatus for activating a hookswitch circuit of a telephone, the telephone having a hookswitch well associated with a hookswitch circuit, the hookswitch circuit having an on-hook state and an off-hook state, the apparatus comprising:

first means having a first state for disposing the hookswitch circuit into the on-hook state, and a second state for disposing the hookswitch circuit into the off-hook state; and a shape memory alloy coupled to the first means and responsive to an electrical current flowing through the shape memory alloy to alternate the first means between its first state and its second state.

27. The apparatus of claim 26 wherein the shape memory alloy is preheated to quickly change the position of the first means from its first state to its second state.

* * * * *